Figure 1:
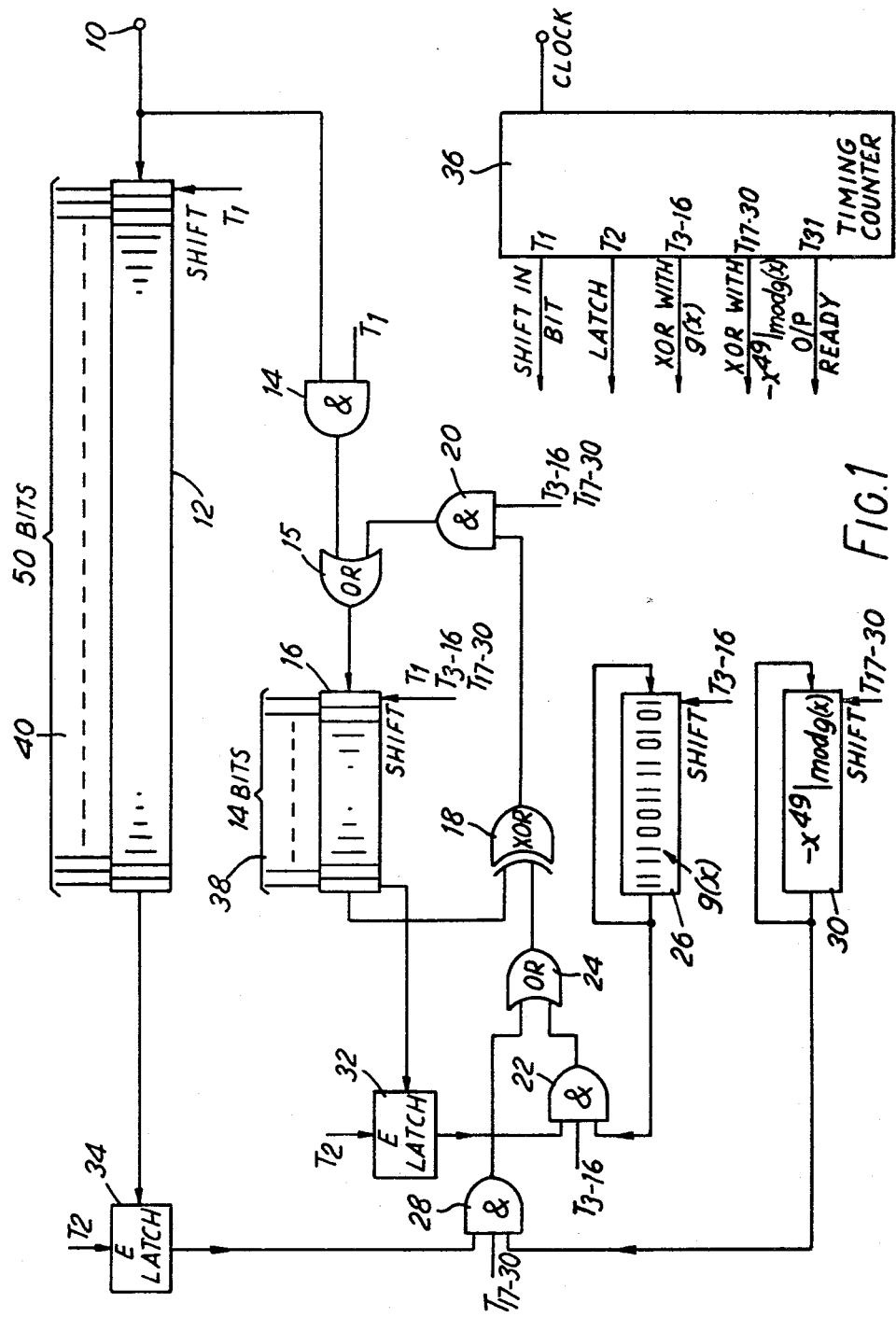

United States Patent [19]

Metcalf et al.

[11] Patent Number: 4,468,770

[45] Date of Patent: Aug. 28, 1984

[54] DATA RECEIVERS INCORPORATING ERROR CODE DETECTION AND DECODING

[75] Inventors: Eric Metcalf, Alresford; Michael C. Jeffery, Fleet, both of England

[73] Assignee: Sangamo Weston Limited, Enfield, England

[21] Appl. No.: 351,793

[22] Filed: Feb. 24, 1982

[30] Foreign Application Priority Data

Mar. 3, 1981 [GB] United Kingdom ............... 8106677

[51] Int. Cl.³ ........................................... G06F 11/10
[52] U.S. Cl. ................................... 371/42; 371/37
[58] Field of Search ............................ 371/42, 37

[56] References Cited

U.S. PATENT DOCUMENTS

| | | | |
|---|---|---|---|
| 3,336,467 | 8/1967 | Frey, Jr. .............................. | 371/42 |
| 3,466,601 | 9/1969 | Tong .................................... | 371/42 |
| 3,961,311 | 6/1976 | Pavoni et al. ....................... | 371/42 |
| 4,059,825 | 11/1977 | Greene ................................ | 371/37 |
| 4,388,727 | 6/1983 | Metcalf ............................... | 375/88 |
| 4,406,924 | 9/1983 | Dorey ................................. | 179/2 A |
| 4,428,061 | 1/1984 | Skinner et al. .................... | 364/728 |

FOREIGN PATENT DOCUMENTS 2018095 10/1979 United Kingdom .

*Primary Examiner*—Charles E. Atkinson
*Attorney, Agent, or Firm*—Dale Gaudier

[57] ABSTRACT

A data receiver is required to detect successive 50-bit frames of data which are transmitted without any pause between frames and with a start bit value of 1 as the only start-of-frame indication. Error detection and correction is obtained by appending at the transmitter a 13-bit check word to 36 data bits (and the start bit), the value of the check word being chosen such that division of the error-free composite 49-bit code word by a predefined generator polynomial yields a syndrome (remainder) of zero. Calculation of a new syndrome value by the receiver at the speed necessary during initial frame synchronization (i.e. for each successive bit) is effected with an iterative procedure in which the previous syndrome value is left-shifted one place and the newly received digit is appended to it; the generator polynomial is added to the result by modulo-2 arithmetic if the most significant digit of the shifted syndrome word is a 1; and the remainder of $-2^{49}$ divided modulo-2 by the generator polynomial is added to the result of the previous step by modulo-2 arithmetic if the digit received 49 bits before the newly received digit is a 1.

2 Claims, 1 Drawing Figure

DATA RECEIVERS INCORPORATING ERROR CODE DETECTION AND DECODING

This invention relates to receivers for receiving signals comprising a carrier signal modulated with a digital signal, of the kind having provision for the detection and decoding of an error code incorporated in the digital signal.

In U.S. Pat. Nos. 4,388,727, 4,406,924, and 4,428,061 there is described a receiver for the detection, decoding and implementation of digital control signals modulated on a broadcast or mains-borne carrier signal. The digital signal comprises successive frames or blocks each of 50 binary digits (bits) comprising 36 actual data digits and 14 digits for timing and error detection. As described, the error detection relies upon the use of a cyclic redundancy code (CRC) which is not capable of enabling error correction as well as error detection. Error correcting codes using full-length or shortened cyclic codes are known, in which the values of, for example, 13 bits, known as a check word, appended to the 36 actual data bits are chosen such that division of the resulting 49-bit code word by a predefined order-13 generator polynomial gives a remainder, or syndrome, of exactly zero. However, known methods of implementing them, involving detection and decoding of each successive syndrome independently, require excessively time-consuming manipulation for use in the described receiver during the initial frame synchronisation step of the reception process, when groups of 50 bits, starting at each successive bit in turn, must be scanned to identify the start position of a true block or frame of transmitted data. Such scanning involves, inter alia, the detection and decoding of the syndrome for the most recently received group of 50 bits, as every new bit in turn is received.

According to one aspect of this invention there is provided a receiver (which may be generally as described in the aforementioned U.S. patents) for receiving a signal comprising a carrier signal modulated with a digital signal in the form of successive blocks each of m binary digits including n binary digits forming a check word derived from the originally transmitted data and a predetermined n digit generator polynomial for the error code, for the detection and/or correction of errors in the received data, wherein the receiver is arranged to decode, upon receipt of each successive digit of the digital signal, the syndrome for the block of m digits terminating with the most recently received digit, by the steps of:

shifting each digit of the previously decoded syndrome to the next more significant digit position and entering the said most recently received digit of the demodulated digital signal into the least significant digit position;

adding by modulo-2 arithmetic to the shifted word, in accordance with the value of the most significant digit thereof, the value of the predetermined generator polynomial; and.

adding by modulo-2 arithmetic to the result thereof, in accordance with the value of the digit received m digits before the said most recently received digit, the value of the remainder derived by modulo-2 division of $-2^m$ by the predetermined generator polynomial.

With such a receiver, each successive syndrome is derived iteratively from the previously-generated syndrome thereby limiting the manipulation to that required to take into account the addition of a new least significant bit, the loss of the old most significant bit and the shift of the remaining bits by one digit position.

Since the procedure is iterative, it requires a starting or 'seed' value. Conveniently, this can be zero for an initial value of zero for the m-bit block.

A complete frame of data may include one or more fixed-value start bits: for example, the first bit may always have a value of logic 1. Where this bit is not included in the derivation of the check word at the transmitter, the value of m will be one less than the length of the overall data frame including the start bit. In these circumstances, the digit defined above as being received m digits before the most recently received digit will correspond to the first, start, digit of a frame. However, the start digit or digits could be included in the check word derivation, in which case the above-defined digit would correspond instead to the final digit of the preceding frame and the value of m would be the same as the length of the overall data frame.

A receiver in accordance with this invention will now be described, by way of example, with reference to the accompanying drawings, in which:

FIG. 1 is a block schematic diagram of the circuitry incorporated in the receiver for implementing the syndrome detection and decoding.

The circuit shown in FIG. 1 is intended for use in a receiver for receiving signals comprising a carrier signal modulated with a digital signal. The carrier may be a broadcast radio signal, for example the British Broadcasting Corporation's long-wave Radio 4 signal, or a mains-borne high-frequency signal. In such a system, the data to be transmitted, to control for example tariff-switching and load-shedding in an electrical power distribution network, is formed into successive blocks of binary digits or bits, 36 bits of actual data being combined with a 14 system function bits to make each successive block 50 bits in length. The system function bits are used for timing, in particular by means for a '1' bit to designate the start of any 50-bit block, and for detection, and, if possible, correction of errors in the received data.

The principal details of such a receiver, relating to the demodulation of, synchronisation with, and detection of the individual bits of the received signal are fully described in the U.S. Pat. Nos. 4,388,727, 4,406,924, and 4,428,061 and need not be described here. For the purposes of the following discussion it is assumed that these functions have been performed and that a stream of successive bits is being produced for further processing, in particular for synchronisation with the 50-bit blocks or frames of data and for error detection and correction.

The type of error code envisaged involves the use of a cyclic code, defined by a specified order-13 generator polynomial expression and implemented by effectively dividing each 36-bit data group by the polynomial expressed in binary number form, and adding the difference between the remainder and the polynomial, which will have a maximum of 13-bits and is called a check word, to the data group to form, with the start bit, the full 50-bit code word. Thus, if the division process is repeated at the receiver on the full 50-bit block, less the start bit, and the data has not been corrupted during propagation of the carrier, the data should be exactly divisible by the generator polynomial, giving a remainder, known as a syndrome, of zero. A non-zero syndrome indicates that the received data is corrupted and contains errors: further processing of the syndrome may enable the actual erroneous bits to be identified and thus corrected. An example of a generator polynomial defining a cyclic redundancy code is $$x^{13}+x^{12}+x^{11}+x^{10}+x^7+x^6+x^5+x^4+x^2+1$$

for which the equivalent binary number is 11110011110101.

It is known that the required division of a data word by such a polynomial to derive the syndrome can be effected by shifting each bit of the word into a shift register of the same length as the number, and adding the number to the contents of the register using modulo-2 addition (equivalent to performing an exclusive-OR operation on corresponding bits of the register contents and the number) if the most significant bit in the register is a 1. This process is continued until all the bits of the data word have been shifted into the register, the contents of which then gives the required result - i.e. the remainder of the division process.

Although such a technique is theoretically applicable in the present context, it in fact requires excessively time-consuming manipulation of the incoming data stream at least during the initial synchronisation phase of operation, when the receiver is searching for the position in the stream of digits of the start of a group of 50 bits comprising an real data block. This procedure involves arbitrarily choosing any bit with a value of 1 (the required value for a start bit) and then deriving the value of the syndrome for the following 49 bits. If the syndrome is non-zero indicating most probably that that 1 bit is not a start bit, the procedure is repeated for the block of 50 bits commencing with the next following 1 bit. Repeated shifting and modulo-2 addition of the generator polynomial as described above effectively involves completely re-deriving the syndrome each time, even though the majority of the bits involved are the same as those in the previous derivation. FIG. 1 shows a circuit for repetitively deriving the syndrome and which avoids this drawback.

Referring to FIG. 1, the demodulated stream of data bits is applied to an input 10 coupled to the least-significant bit (1 sb) input of a 50-stage shift register 12 and, via one input of an AND gate 14 and an OR gate 15, to the input of a 14-stage shift register 16. The output from the most-significant bit (msb) of the shift register 16 is coupled to one input of a two-input XOR gate (exclusive-OR gate) 18, the output of which is coupled via one input of an AND-gate 20 and the OR gate 15 back to the 1 sb input of the same register 16. The other input of the XOR gate 18 is coupled to receive, via one input of a three-input AND gate 22 and one input of an OR gate 24, the msb output from a first 14-stage recirculating shift register 26; and to receive via one input of another three-input AND gate 28 and the other input of the OR gate 24, the msb output from a second 14-stage recirculating shift register 30. A second input of each AND-gate 22 and 28 is coupled to the output of a respective latch 32 and 34, the inputs of which are coupled to the msb outputs of the shift registers 16 and 12 respectively.

The third inputs of the AND gates 22 and 28 are coupled to appropriate control outputs as described below of a timing counter 36, as are the second inputs of the AND gates 14 and 20, the enable inputs of the latches 32 and 34 and the shift control inputs of the registers 12, 16, 26 and 30. The counter 36 is supplied with clock pulses at a repetition frequency at least 32 times the bit rate of the demodulated data signal on the input 10. The design of the counter 36, using for example a 5-bit binary counter and AND and OR gates to provide the desired control output signals is conventional and need not be discussed here.

The recirculating shift register is preset with the binary number corresponding to the above-defined generator polynomial, that is to 11110011110101. Likewise, the recirculating shift register 30 is preset with the binary number corresponding to the remainder or syndrome resulting from the division, according to the known rules of polynomial arithmetic, of $-x^{49}$ by the generator polynomial.

The counter 36 is arranged in any convenient manner to be synchronised with the input data stream, so that it re-starts the timing and control sequence to be described as each bit of the data stream arrives at the input 10.

Upon re-starting, the counter 36 commences timing interval $T_1$, during which a pulse is applied to the shift inputs of the registers 12 and 16, and also to the second input of the AND-gate 14, thereby enabling the bit currently present at the input 10 to be shifted into the registers 12 and 16. At the same time, the existing contents of these registers are shifted one position to the left.

In timing interval $T_2$, the enable inputs of the latches 32 and 34 are energised, causing them to latch in and store the values of the bits just shifted into the msb stages of the registers 16 and 12 respectively.

During timing intervals $T_3$ to $T_{16}$, the counter 36 supplies 14 successive input pulses to the shift inputs of the registers 16 and 26, and simultaneously energises the third input of the AND gate 22, and also the second input of the AND gate 20 to couple the output of the XOR gate 18 to the 1sb input of the register 16. If the msb value previously latched into the latch 32 is a logic 1, the AND gate 22 is enabled, so that the recirculating contents of the register 26 can pass through it and the OR-gate 24 to be combined, according to exclusive-OR logic, bit-for-bit with the contents of the register 16 by the XOR gate 18. The result of this operation is entered back into the register 16 via the AND gate 20. If the latched msb value is logic 0, the AND gate 22 remains disabled, so the XOR gate 18 behaves like a simple OR gate and the contents of the register 16 recirculate unchanged.

Thereafter, during timing intervals $T_{17}$ to $T_{30}$, the counter supplies 14 input pulses to the shift inputs of the registers 16 and 30, while energising the third input of the AND gate 28 and the second input of the AND gate 20. Thus, a procedure similar to that just described is performed, but this time to exclusive-OR the contents of the registers 16 and 30 bit-for-bit if the msb value latched into the latch 34 from the register 12 is a logic 1. Again, if this value is a logic 0, the contents of the register 16 recirculate unchanged.

Finally, during timing interval $T_{31}$, the contents of the register 16 (the required new syndrome value) can be examined, via parallel outputs 38, to check whether or not they are equal to zero. A zero result indicates an error-free data block in the register 12, which can then be moved to other circuitry via parallel outputs 40 for further processing.

A non-zero result in the register 16 indicates an erroneous data block in the register 12, which is most likely to be caused, during the initial frame synchronisation period, by lack of synchronisation. Thus the procedure is repeated for the successive bits of the incoming data stream until a zero syndrome, and thus synchronisation, are attained. For this purpose the counter 36 is restarted, possibly after a delay to allow other procedures to take place, and the above sequence of events repeated for the next bit of the data stream.

Once synchronisation is obtained, the circuit can be allowed to continue to operate, any non-zero syndrome thereafter being used in known manner for detection and correction of errors in individual data blocks.

In the above description it is assumed that the first bit of the data block is used as a fixed-value block-start bit, and excluded from the check word derivation at the transmitter. In this case, as described above, the shift register 12 need only be as long as the overall data block, that is the true data plus the check word plus the start bit. Otherwise, the register 12 would have to be one bit longer than the data block length.

The operation of the circuit can be explained as follows:

For any given bit in the data stream occurring at time m relative to some arbitrary starting time, the value of the syndrome $S_m(x)$ for the data block terminating with that bit (and excluding the block-start bit) is the remainder of $$(V_{48+m}x^{48} + V_{47+m}x^{47} \ldots V_{0+m})/g(x)$$

where $V_f$ is the value of the bit occurring t bits before the current bit and $g(x)$ is the generator polynomial.

The value of the syndrome $S_{m-1}(x)$ for the block terminating with the following bit is the remainder of $$(V_{47+m}x^{48} + V_{46+m}x^{47} + \ldots V_{m-1})/g(x)$$
$$= (x(V_{48+m}x^{48} + V_{47+m}x^{47} + V_{46+m}x^{46} + \ldots + V_m) + V_{m-1} - V_{48+m}x^{49})/g(x)$$

However, the expression in the inner brackets is the numerator of the expression for $S_m(x)$. Thus $$S_{m-1}(x) = xS_m(x)|\text{mod } g(x) + V_{m-1} - V_{48+m}x^{49}|_{\text{mod } g(x)}$$

The first term on the right hand side of this expression is implemented by shifting the value for $S_m(x)$ one position to the left (while shifting in the next bit of the data stream to implement the second term) and then adding in the generator polynomial by modulo-2 addition, if the most significant bit is a logic 1; the third term is implemented by modulo-2 addition, if the value of $V_{48+m}$ (the msb value in the register 12) is logic 1, of the remainder of $-x^{49}$ divided by $g(x)$. The negative value can be implemented by use of 2's complement binary arithmetic.

Being an iterative procedure, this derivation requires an error-free starting value for the syndrome. One convenient value is zero for a data block consisting of all zeros.

We claim:

1. A method for iteratively decoding respective syndromes for groups of m bits of a multi-bit digital signal, each group starting one bit later in the signal than the previous group, the digital signal being arranged in the form of successive blocks each of m bits, each block including at least a first series of bits comprising a data word and a second series of bits comprising a check word, the check word being derived from the data word and a predetermined n-bit generator polynomial for providing an error correction code, comprising the steps of:

(a) storing an initial predetermined syndrome in a shift register;
    (b) receiving a bit of the digital signal;
    (c) entering the bit of the digital signal into the least significant bit position in the shift register and shifting each bit of the syndrome to the next more significant bit position in the shift register to produce a modified version of the syndrome;
    (d) adding by modulo-2 arithmetic the value of the predetermined n-bit generator polynomial to the modified syndrome produced in step (c), in accordance with the value of the most significant bit thereof, to produce a partial new syndrome;
    (e) adding by modulo-2 arithmetic to the partial new syndrome produced in step (d) the value of the remainder of modulo-2 division of $-2^m$ by the value of the predetermined generator polynomial, in accordance with the value of a bit received m bits before the bit of the digital signal previously entered in the shift register in step (c), to derive a new syndrome;
    (f) storing this new syndrome in the shift register; and
    (g) repeating steps (b)–(g) for the next successive bit of the digital signal.

2. In a data receiver of the type adapted to receive a carrier signal modulated with a multi-bit digital signal which is arranged in the form of successive blocks each of m bits, each block including at least a first series of bits comprising a data word and a second series of bits comprising a check word, the check word being derived from the data word and a predetermined n-bit generator polynomial for providing an error correction code, the improvement comprising means for iteratively decoding respective syndromes for groups of m bits of the digital signal, each group starting one bit later in the signal than the previous group, the decoding means comprising:

shift register means;
    means for storing an initial predetermined syndrome in the shift register means;
    means for receiving a bit of the digital signal;
    means, coupled to the receiving means, for entering the bit of the digital signal into the least significant bit position in the shift register means and for shifting each bit of the syndrome to the next more significant bit position in the shift register means to produce a modified version of the syndrome;
    first means, coupled to the shift register means, for adding by modulo-2 arithmetic the value of the predetermined n-bit generator polynomial to the modified version of the syndrome, in accordance with the value of the most significant bit thereof, to produce a partial new syndrome;
    means for supplying the value of the remainder of modulo-2 division of $-2^m$ by the value of the predetermined generator polynomial;
    second means, coupled to the shift register means and the remainder-supplying means, for adding by modulo-2 arithmetic the value of the remainder to the partial new syndrome, in accordance with the value of a bit received m bits before the bit of the digital signal previously entered into the shift register means, to derive a new syndrome therefrom and for storing this new syndrome in the shift register means; and
    timing means for causing the next successive bit of the digital signal to be applied to the least significant bit position in the shift register means and for successively enabling the shift register means, the first adding means and the second adding means.

* * * * *